3,136,807
PREPARATION OF HIGH PURITY TRIALKYL TRITHIOPHOSPHATES
Paul F. Warner and James R. Slagle, both of Phillips, Tex., assignors to Phillips Petroleum Company, a corporation of Delaware
No Drawing. Filed Dec. 18, 1961, Ser. No. 160,234
6 Claims. (Cl. 260—461)

This invention relates to the preparation of S,S,S-trialkyl trithiophosphates. In accordance with one aspect, this invention relates to an improved process for the stepwise oxidation of a trialkyl trithiophosphite to form a high purity trialkyl trithiophosphate. In another aspect, this invention relates to the trialkyl trithiophosphates of high purity obtained according to the process of the invention.

The synthesis of trialkyl trithiophosphates by reacting first a mercaptan with a phosphorous trihalide to form a trialkyl trithiophosphite, and then oxidizing the trithiophosphite to form the corresponding trithiophosphate is known. However, in the prior art synthesis of these compounds considerable difficulty has been experienced in obtaining a high purity phosphate product. Various expedients have either been proposed or tried with little success. For example, extended periods of oxidation have been attempted without success or with, at most, marginal improvement in product purity. Also, various purification treatments, such as water washing, and the like, have been employed in an attempt to purify the final phosphate product. Thus it can be seen that there is still a distinct need for an economical process for the preparation of high purity trialkyl trithiophosphates.

According to the invention, it has been found that the oxidation step in the above process can be greatly improved whereby a high purity phosphate product of the order of about 95% is obtained without the usual purification steps normally employed in recovering the phosphate product by utilizing stepwise oxidation with different oxidizing agents.

Accordingly, an object of this invention is to provide an improved process for the oxidation of trialkyl trithiophosphites to form high purity trialkyl trithiophosphate products.

Another object of this invention is to provide a high purity trialkyl trithiophosphate product.

A further object of this invention is to provide an economical and simple oxidation process for the production of trialkyl trithiophosphates of high purity in a shorter period of time.

Other objects, aspects, as well as the several advantages of the invention will be apparent to those skilled in the art upon a further consideration of the specification and the appended claims.

Broadly, according to the invention, an improved oxidation process is provided for the conversion of trialkyl trithiophosphites to high purity trialkyl trithiophosphates which comprises carrying out the oxidation stepwise with dfferent oxdizing agents.

More specfically, according to the invention, an improved oxidation process is provided for the production of high purity trialkyl trithiophosphates, such as S,S,S-tri-n-butyl trithiophosphate, which comprises first partially oxidizing a trialkyl trithiophosphite with air to form said trithiophosphate with then completing the oxidation with hydrogen peroxide, and then recovering said trithiophosphite as a product of the process.

According to the invention, it has been found that the oxidation of trialkyl trithiophosphites can be greatly improved by using a combination of air and hydrogen peroxide to the point that the water wash and other purifications normally employed are not necessary. The trialkyl trithiophosphate product obtained according to the invention has a final purity of about 95 weight percent. By carrying out the oxidation according to the present invention, a higher purity product is obtained in a shorter period of time than is possible using air alone or hydrogen peroxide alone as will be demonstrated by the specific examples hereinbelow.

In actual operation, the reaction mixture obtained from the reaction of an alkyl mercaptan with a phosphorous trihalide, preferably phosphorous trichloride, is oxidized stepwise first preferably by air to about 80 percent phosphate and then oxidized to about 95 percent phosphate with hydrogen peroxide. The hydrogen peroxide is preferably contacted with the partially oxidized phosphite solution as a solution. The amount of air and hydrogen peroxide employed during the oxidation process is ordinarily stoichiometric amounts although amounts above and below stoichiometric amounts can be employed when desired. The temperature employed for the stepwise oxidation ordinarily ranges from about 200 to about 300° F. although temperatures outside this range can be employed when desired. The air oxidation step of the invention will ordinarily be continued from about 2 to about 6 hours preferably from about 3 to about 4 hours. The hydrogen peroxide oxidation step is continued until completion or about 95% phosphate.

The oxidation steps can be carried out by any procedure known in the art. One convenient method that can be employed comprises aerating or bubbling air through a column of a trialkyl trithiophosphite reaction mixture. The vessel employed can contain various means such as packing, trays, and the like, to facilitate contacting of the phosphite with air. After the phosphite reaction mixture has been partially oxidized with air, it is then contacted in the same or different means and heated with hydrogen peroxide ($H_2O_2$) to complete the oxidation.

The trialkyl trithiophosphite oxidized according to the invention can be prepared by any known procedure. Ordinarily, the trialkyl trithiophosphite is formed by reacting a phosphorus trihalide with a mercaptan at a temperature in the range of 100 to about 300° F. Ordinarily the mol ratio of mercaptan to phosphorous trihalide ranges from about 3–5:1. Phosphorous trihalides that can be employed include phosphorous trichloride, phosphorous tribromide and phosphorous triiodide, preferably the trichloride. The mercaptans normally employed are the alkyl mercaptans containing from three to five carbon atoms per molecule, preferably n-butyl mercaptan. One suitable procedure for preparing the trialkyl trithiophosphites is disclosed in Crouch patent U.S. 2,682,554.

While the preferred oxidizing agent is air in the first step of the oxidation treatment according to the invention, oxygen or ozone or mixtures of these materials with air or mixtures of oxygen and ozone can also be employed when desired. As previously described, hydrogen peroxide, preferably a solution of hydrogen peroxide, is utilized as the oxidizing agent in the second step or final step of the oxidation treatment of the invention.

The trialkyl trithiophosphates are known materials and have a variety of uses as is well known in the art. One particular valuable application of the trialkyl trithiophosphates is for the defoliation of cotton.

A more comprehensive understanding of the invention can be obtained by referring to the following illustrative examples which are not intended, however, to be unduly limitative of the invention.

*Specific Examples*

S,S,S-tri-n-butyl trithiophosphite was prepared by reacting phosphorous trichloride with n-butyl mercaptan at a temperature ranging from 100 to 300° F. The mol ratio of butyl mercaptan to $PCl_3$ employed was 3.2. The reaction is illustrated by the following equation:

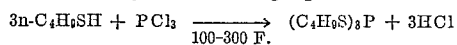

$$3\text{n-}C_4H_9SH + PCl_3 \xrightarrow[100-300\ F.]{} (C_4H_9S)_3P + 3HCl$$

The n-butyl mercaptan was placed in a three-neck creased type mixing flask and phosphorous trichloride was added from a dropping funnel over a period of one to two hours. Under gentle heat at the start, 90–100° F., HCl gas evolved rapidly and was passed through either a water cooled or a Dry-Ice-acetone cooled condenser and then collected in a tared water or caustic trap which would be weighed periodically to follow the progress of the reaction. After all of the $PCl_3$ was added and evolution of HCl slowed appreciably, the temperature was raised gradualy to a maximum of 300° F. and held there until no more HCl evolved.

The crude phosphite mixture obtained above, after stripping out unreacted mercaptan to a kettle temperature of 300° F., was aerated at 230° F. for six hours using approximately one stoichiometric volume of air per hour to partially oxidize the phosphite to phosphate. The reaction is illustrated as follows:

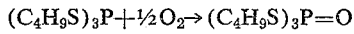

$$(C_4H_9S)_3P + \tfrac{1}{2}O_2 \rightarrow (C_4H_9S)_3P=O$$

The purity of the partially oxidized mixture was determined and it was found that the phosphate at this point was 89.6 weight percent.

The above partially oxidized mixture was then contacted with hydrogen peroxide to complete oxidation. To 105 grams of the hot phosphate solution obtained above was added 2.5 grams of 50% hydrogen peroxide. The temperature rose from 230 to 244° F. during the addition, then further heat was applied until the temperature reached 270° F. No water phase was present. After cooling down the oxidized reaction mixture, the phosphate product purity was found to be 94.9 weight percent. Although 6 hours air oxidation time was used above, 3 hours air oxidation would have been adequate in combination with $H_2O_2$ oxidation.

The oxidation steps described were carried out in a glass tube 1¼ inches I.D. by 8 inches long equipped with a sintered glass disk at the bottom. The trithiophosphite reaction mixture was placed in the glass tube and air was dispersed into the phosphite through the glass disk.

For comparative purposes, three runs were carried out wherein the tri-n-butyl trithiophosphite reaction mixture was oxidized with air alone and with hydrogen peroxide alone.

In one run, the tri-n-butyl trithiophosphite reaction mixture was aerated with a stoichiometric amount of air for six hours. The resulting phosphate product had a purity of 89.6 weight percent. In another run, the trithiophosphite reaction mixture was subjected to air oxidation for nine hours with a stoichiometric amount of air. The purity of the phosphate product was found to be 90.7 weight percent. Thus, it can be sene that extension of the oxidation treatment with air alone resulted in a very marginal increase in product purity. In still another run, the trithiophosphite reaction mixture was subjected to hydrogen peroxide oxidation only. The purity of the phosphate product was found to be 76.6 weight percent.

Hydrogen peroxide is not satisfactory for the entire oxidation step because the trithiophosphite is unstable in the presence of water. However, the phosphate is unaffected by water.

As shown above in the specific examples, air oxidation followed by peroxide oxidation according to the invention resulted in a phosphate product having a purity of 94.9 weight percent. The process of the invention yields a higher purity phosphate product in a shorter period of time than is possible using air or peroxide oxidation alone.

As will be evident to those skilled in the art, many variations and modifications of the invention can be practiced in view of the foregoing disclosure. Such variations and modifications are clearly believed to come within the spirit and scope of the invention.

We claim:

1. In a process for preparing trialkyl trithiophosphates comprising reacting an alkyl mercaptan with a phosphorous trihalide to form a trialkyl trithiophosphite, oxidizing the reaction mixture at a temperature ranging from about 200 to about 300° F. to form the trialkyl trithiophosphate, and recovering said trithiophosphate as a product of the process, the improvement for increasing the purity of said product which comprises carrying out said oxidation stepwise by first partially oxidizing said reaction mixture with air to about 80% phosphate and then completing said oxidation to about 95% phosphate with $H_2O_2$.

2. A process according to claim 1 wherein said mercaptan is n-butyl mercaptan and said halide is phosphorous trichloride.

3. A process for the production of trialkyl trithiophosphates of high purity which comprises first oxidizing a trialkyl trithiophosphite containing from 3 to 5 carbon atoms per alkyl group with air for a period of time ranging from about 2 to about 6 hours and then completing said oxidation with $H_2O_2$, and recovering said phosphate as a product of the process, said oxidation being conducted at a temperature ranging from about 200 to about 300 F.

4. A process according to claim 3 wherein said air oxidation is continued to about 80% phosphate and said $H_2O_2$ oxidation to about 95% phosphate.

5. A process for the production of S,S,S-tri-n-butyl trithiophosphate of about 95% purity which comprises first oxidizing S,S,S-tri-n-butyl trithiophosphite to about 80% phosphate with air for a period of time ranging up to about 6 hours and then oxidizing with $H_2O_2$ to about 95% phosphate, said oxidation being conducted at a temperature ranging from about 200 to about 300° F., and recovering said high purity trithiophosphate as a product of the process.

6. A process according to claim 5 wherein said oxidations are carried out with stoichiometric amounts of air and $H_2O_2$ and wherein said $H_2O_2$ is a 50% solution of $H_2O_2$.

References Cited in the file of this patent

UNITED STATES PATENTS 2,943,107      Rattenbury et al. _____ June 28, 1960